C. Brinckerhoff,

Horse Boots,

N° 85,205.  Patented Dec. 22, 1868

Witnesses.  Inventor.

CHARLES BRINCKERHOFF, OF FISHKILL, NEW YORK.

Letters Patent No. 85,205, dated December 22, 1868.

IMPROVED INDIA-RUBBER FENDER FOR INTERFERING HORSES.

The Schedule referred to in these Letters Patent and making part of the same.

*To all whom it may concern:*

Be it known that I, CHARLES BRINCKERHOFF, of Fishkill, in the county of Dutchess, and State of New York, have invented a new and improved India-Rubber Fender for Interfering Horses; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
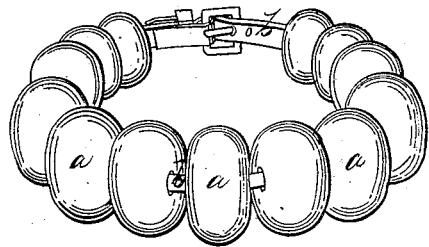
Figure 1 is a perspective view of my invention.
Figure 2:
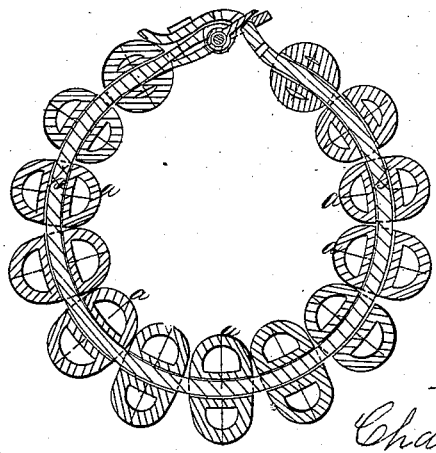
Figure 2 is a longitudinal central section taken in the plane of the line $x\,x$, fig. 1.

This invention relates to the production of a new article of manufacture, the same consisting of a number of India-rubber balls secured on a strap, or the like, to be secured around the ankle or leg of the horse which is struck by the opposite hoof, or interfered with in any way, or, indeed, it may be applied to the interfering hoof.

In the drawings—

$a\,a$ designate a series of solid or hollow rubber balls, which are larger in size near the centre of the strap or cord, and decrease in size toward each end, the same having holes made through their centre, and a strap or strings run through to hold them in place.

This string of rubber balls is secured around the horse's leg, at the point where the hoof strikes against or interferes with the same, or upon the hoof which interferes with the leg.

This simple device will be found very efficient for the purpose for which it is intended, and it will certainly prevent injury to a horse's leg, caused by the hoof striking the same, as can be readily understood.

I am aware that wooden and bone balls have been used for the above purpose before; also, that the application of rubber to the hoof of the horse is not new.

What I claim, is—

The arrangement of a series of perforated, hollow, and flexible rubber balls, $a$, upon a leather strap, $b$, for forming a fender for interfering horses, all as herein shown and described.

The above specification of my invention signed by me, this 24th day of October, 1865.

CHARLES BRINCKERHOFF.

Witnesses:
H. H. HUSTIS,
A. J. GILMER.